(No Model.)  B. A. FISKE.  2 Sheets—Sheet 1.
ELECTRICAL SIGNALING SYSTEM.

No. 527,958.  Patented Oct. 23, 1894.

WITNESSES:
Gustave Dietrich
H. R. Moller

INVENTOR
Bradley A Fiske
BY
Park Benjamin
his ATTORNEY.

(No Model.) 2 Sheets—Sheet 2.

B. A. FISKE.
ELECTRICAL SIGNALING SYSTEM.

No. 527,958. Patented Oct. 23, 1894.

Witnesses
H. R. Moller
M. Posch

Inventor
Bradley A. Fiske
By his Attorney
Park Benjamin

United States Patent Office.

BRADLEY A. FISKE, OF THE UNITED STATES NAVY.

ELECTRICAL SIGNALING SYSTEM.

SPECIFICATION forming part of Letters Patent No. 527,958, dated October 23, 1894.

Application filed May 13, 1892. Renewed September 15, 1894. Serial No. 523,102. (No model.)

*To all whom it may concern:*

Be it known that I, BRADLEY A. FISKE, of the United States Navy, have invented a new and useful Improvement in Electrical Signaling Systems, of which the following is a specification.

My invention relates to an electrical signaling system intended more particularly for use on board ship as an engine-room telegraph.

My invention consists in the novel construction and arrangement of the transmitting and receiving instruments, and in their combination in circuit as hereinafter particularly described.

Figure 1:
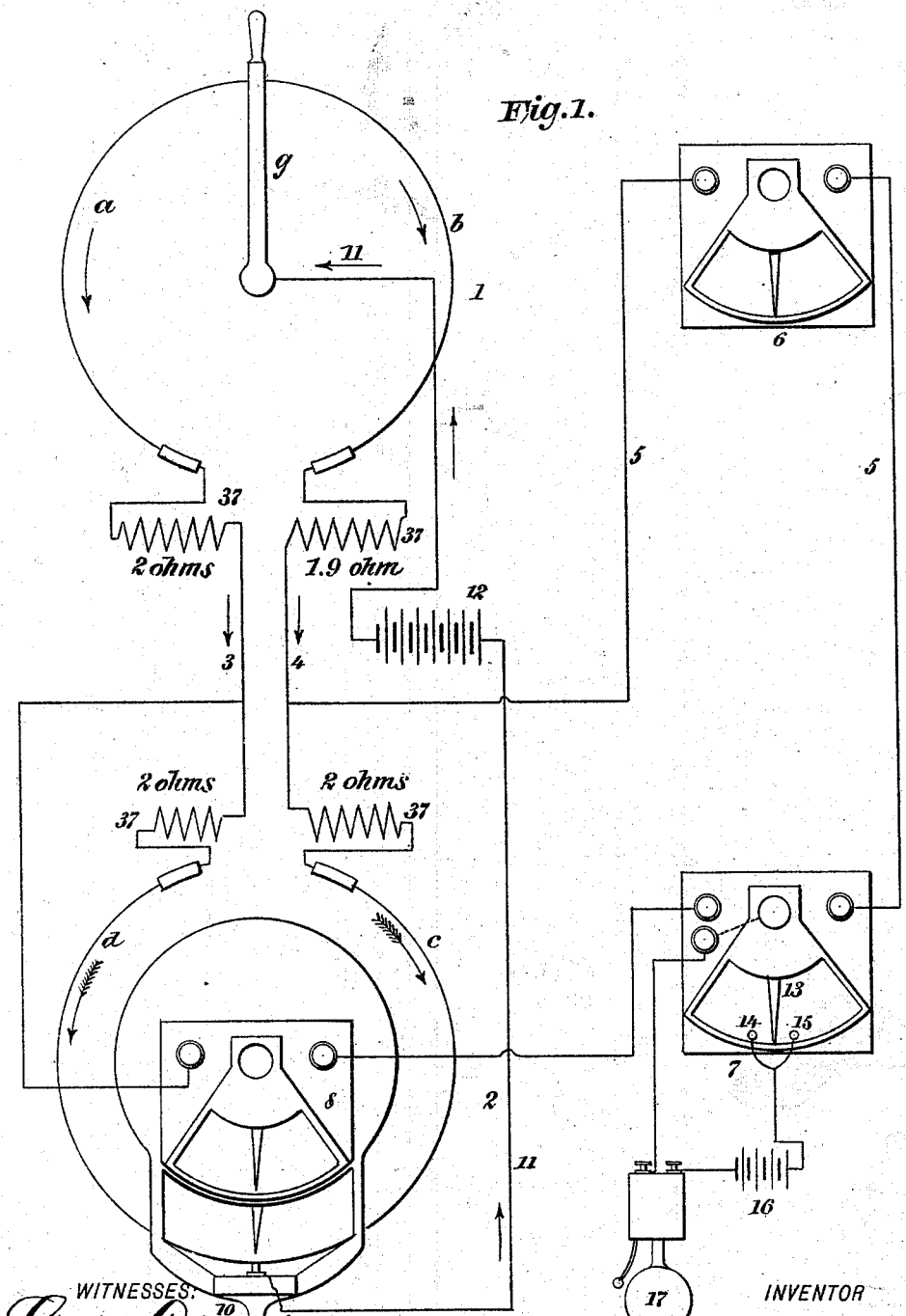
Figure 2:
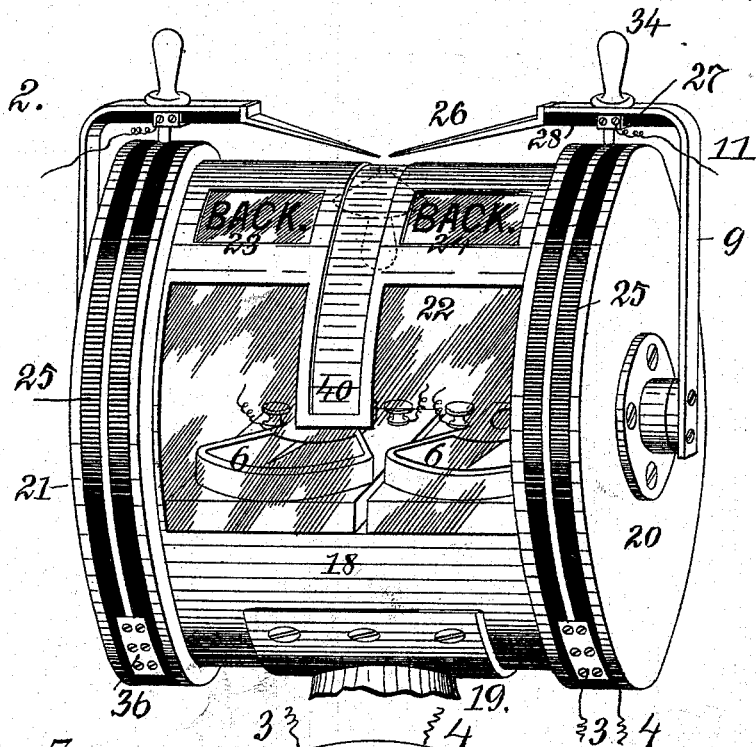

Referring to the accompanying drawings, Figure 1 represents my invention diagrammatically. Fig. 2 is a perspective view of the transmitting instrument, and Fig. 3 is a plan view of the receiving instrument.

Similar letters and figures of reference indicate like parts.

Figure 3:
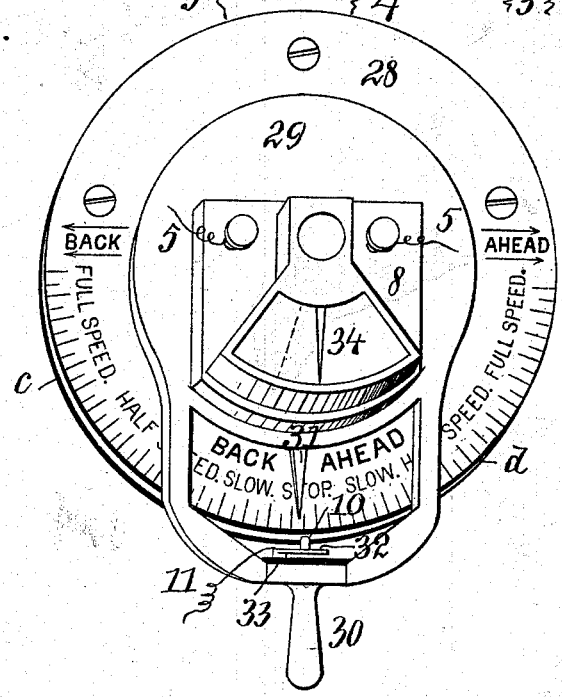

I will first describe the general construction of the apparatus, and the arrangement of circuits as shown in Fig. 1, and afterward refer specifically to the devices shown in Figs. 2 and 3.

At 1, Fig. 1, is represented the transmitting instrument shown in Fig. 2. At 2, Fig. 1, is represented the receiving instrument shown in Fig. 3. The transmitting instrument contains a conductor, $a, b$, of wire bent nearly into circular form. A similar conductor $c, d$ is arranged in the receiving instrument 2. The ends of the conductors $a\ b$ and $c\ d$ are connected by circuit wires 3 and 4. Connected in a loop wire 5, the terminals of which communicate respectively with the middle points of the wires 3 and 4, are three galvanometers, 6, 7 and 8, the particular uses of which will be hereinafter described.

Pivoted in the transmitting instrument 1 is a contact arm, 9, which, when turned on its pivot, moves upon the wire $a, b$. Pivoted in the receiving instrument is a support for a contact point, 10, Fig. 1, which moves upon the wire $c, d$. To the pivot point of arm 9 and the contact point 10, are connected the terminals of a loop, 11, which includes a battery or other source of electricity, 12.

From what has now been stated, it will be evident that the circuit in the instrument is that of a Wheatstone bridge. The contact arm 9 and contact point 10 being disposed at the middle of the length respectively of the circular conductors $a, b$ and $c, d$, it is evident that the four arms of the bridge are as follows: first, the semi-circle $a$ of conductor $a, b$ and the leading wire 3 to the point of connection of loop 5; second, the semi-circle $b$ of conductor $a, b$ and the leading wire 4 to the point of connection of loop 5; third, the semi-circle $d$ of conductor $c, d$ and the leading wire 3 to the point of connection of loop 5; fourth, the semi-circle $c$ of conductor $c, d$ and the leading wire 4 to the point of connection of loop 5. It will also be apparent that when the contacts 9 and 10 occupy similar positions on the conductors $a, b$ and $c, d$, there will be no current in the galvanometers 6, 7, 8, and hence no deflection of the needles; but if the arm 9, for example, be so moved that it no longer occupies the same position on its arc $a, b$, as the contact 10 occupies on its arc $c, d$, then the bridge will be thrown out of balance, and the needles will be deflected. Suppose, for illustration, the arm 9 be moved to the left over an angle of thirty degrees. Then all of the galvanometers will be proportionately deflected. If, however, the contact 10 be also moved to the left over an angle of thirty degrees, the equilibrium in the bridge will be restored, and the galvanometer needles will no longer be deflected. Consequently, if the instruments 1 and 2 be respectively located at distant stations, it will be clear that if the operator of instrument 1 move the arm 9 over an angle of thirty degrees to the left, for example, the observer at the instrument 2 will be apprised of that fact by the deflection of the needle of the galvanometer 8. If he then move his contact point 20 until the galvanometer 8 shows no deflection, he will have placed his contact point 10 in the same position with reference to the conductor $c, d$ as the operator at instrument 1 has placed his contact arm 9 with reference to conductor $a, b$; and if the movement of the arm 9 of instrument 1 to a certain point has some definite signification, then that signification will become known to the observer at instrument 2 by reason of the extent of movement of his contact point 10.

Galvanometer 6 is located at the transmitting station, and galvanometer 7, at the receiving station. The three galvanometers 6, 7 and 8 being similar, the needles of all will be deflected to the same extent simultaneously. The function of galvanometer 6 is to repeat to the operator at instrument 1, the indications of the galvanometer 8 at instrument 2. He thus becomes apprised, first, of the galvanometer deflection caused by his movement of the arm 9, and, second, when the needle of galvanometer 6 returns to zero, he knows that the operator at the receiving station must have adjusted his contact point 10 correspondingly to arm 9, and hence that the signal sent is understood.

In relay circuit with the needle 13 and needle pivot shaft of the galvanometer 7 and with the stops 14 and 15, is a battery 16 and electric bell 17. It will be apparent that so long as the needle 13 is not deflected, the bell 17 will not sound; but as soon as the balance in the main circuit becomes disturbed from any cause, then the needle 13 will move into contact with one or the other stop 14 and 15, and as a consequence, the bell 17 will sound until the balance is re-established. In this way an audible sound is produced at the receiving station whenever the arm 9 is moved, and the attention of the observer at said station is thus called to the fact that a signal has been sent. So, also, if from any cause the circuit wires become broken, crossed, or leaky, the sounding of the bell will indicate that the circuit is out of order, and the ringing will continue until the proper condition is restored.

Referring now to Figs. 2 and 3, 18 is a cylinder of sheet brass, or other suitable material, which is supported, in practice, on a standard, part of which is shown at 19. The cylinder 18 has circular heads, 20 and 21, of metal. In the cylinder periphery is an opening, 22, which is closed with curved, clear glass, so that the interior of the cylinder can be seen. It also has openings, 23 and 24, which may be closed with either clear or simply translucent glass. On the opposite side of the cylinder, not shown, are openings similar to 23, also closed with translucent glass. On the openings last mentioned, and also on the openings 23, are inscribed such words as "Back" and "Ahead," thus indicating the direction in which the operator is to move the contact arm hereinafter referred to. The glass which covers an elongated opening, 40, is provided with a scale-marking which should be graduated in each direction from its middle point to indicate revolutions of the screw-shaft "ahead" and "back." On the circumferential edges of the heads 20, 21, is mounted an envelope of insulating material, 25, and upon this envelope, which may be hard rubber, the conductors, $a$, $b$, are secured. It is to be understood that the instrument shown in Fig. 2 is intended as a telegraph adapted to two engines; as, for example, the star-board and port engine of a vessel having twin screws. Therefore, in Fig. 2, the apparatus represented at 1 in Fig. 1 is duplicated; there being two wires, $a$, $b$, with associated parts, as hereinafter described. A single receiving instrument is shown in Fig. 3, but it is to be understood that with such a double instrument as is shown in Fig. 1, two such receiving instruments as shown in Fig. 3 will, of course, be employed.

Returning now to Fig. 2, 9 is a contact arm pivoted at the center of the head 20, and bent over the circumferential edge of said head and provided with a pointer, 26, which extends over the glass scale in opening 40. On the lower side of the bent-over portion of the arm 9, is secured a contact wiping point, 27, which bears against the conductor $a$. This contact point is supported on a piece of insulating material, 28, so that there is no electrical connection between said contact point and the arm 9; although said contact point is moved over the wire $a$ by means of said arm. To the contact point 27 is secured the battery wire 11. A precisely similar arrangement of parts exists in connection with the head 21. The terminals of each wire, $a$, $b$, are connected to the leading wires 3, 4, as indicated in Fig. 1. Within the cylinder 18, and mounted on any suitable support, is the galvanometer 6. Two of these galvanometers are, of course, used. Supported also within the cylinder and in the upper part thereof, is any suitable source of illumination; such, for example, as a small incandescent lamp provided with a reflecting translucent shade, as indicated in dotted lines. This lamp is connected with any suitable source of electricity, and serves to illuminate the galvanometers within the cylinder 18, and also to render visible, at night, the marking on the inserted glass plates.

Referring now to Fig. 3, 28 is a disk or circular plate of brass supported on any suitable standard. The circumference of this plate is covered with insulating material 29, upon which insulating material is supported the wire conductor $c$, $d$. Upon the plate 28 is pivoted a plate 29, which is provided with a handle 30. There is an opening in the plate 29, through which the outer portion of the plate 28 can be seen. Mounted on the plate 29 is a pointer, 31, and a contact point 10, which point is supported on a spring 32, which bears upon the conductor $c$, $d$. The contact point 10 is supported upon a piece of insulating material, 33, and thus has no electrical connection with the plate 29. Supported upon the plate 29 with the pivot center of its needle 34 concentric with the pivot of said plate 29, is the galvanometer 8. It will be evident, therefore, that when the plate 29 is turned on its pivot by means of the handle 30, the galvanometer turns with the plate because it is rigidly affixed thereto. Upon the plate 28 is a scale-marking corresponding to the scale-marking on the glass plate which covers the opening 40 in the instrument shown in Fig. 1. This marking may be numbered to indicate revolutions in the same way as said glass plate is marked; and it may also have such inscriptions as "Full speed" "Half speed," "Slow" and "Stop," as shown. Also on the plate 28 may be additional inscriptions, such as "Back" and "Ahead" comformably to the inscriptions, on the instrument shown in Fig. 2.

The operation of the apparatus, in practice, is as follows:—The instrument shown in Fig. 2, as already stated, is located on the deck or bridge of the vessel, and is manipulated by means of a handle, such as 34, attached to the arm 9. Let it be assumed that it is desired to send a signal to back at a speed of a certain number of revolutions. The operator, grasping the handle 34, draws it toward him, or in the direction indicated by the plate marked "Back" on the instrument. Noting the pointer 26, he adjusts that pointer over the scale-marking on the glass plate covering the opening 40, which corresponds to the desired number of revolutions of the screw. In doing so, he necessarily moves the contact point 27 over the conductor $a, b$ for a certain distance, and thus throws the circuit out of equilibrium. Let it be assumed that the effect of his so doing is to cause the needle 34 to move to the position indicated by dotted lines in Fig. 3. From the fact that the needle moves toward the inscription "Back" on the instrument in the engine-room, the observer there stationed will know that he is to reverse his engine, and he also will know in which direction he is to move the handle 30 in order to bring the circuit back to equilibrium. The observer in the engine-room, grasping the handle 30, then moves it in the indicated direction, or to the left; and at the same time, he moves, necessarily, the pointer 31 over the scale on plate 28. The effect of his moving the handle 30 in the direction indicated, is, of course, to move the contact point 10 over the wire $c, d$; and if the galvanometer 8 did not move also, the result would simply be that the galvanometer needle would move back to zero; the needle moving in one direction as fast as the pointer 31 moved in the opposite direction; but because the galvanometer also moves with the contact point 10, the resultant of the two motions is to keep the needle stationary; so that the observer has simply to note the direction of the needle 34 when it is deflected, and to bring the pointer 31 in line with that needle. When he has done this, he will have adjusted the circuit to compensate for the disturbance caused at the sending station by moving the handle 34; and as a consequence, the galvanometer 6 at the sending station will return to zero. It will be seen, therefore, that the deflection of the galvanometer 8 not merely acquaints the observer in the engine-room with the direction in which he is to move the handle 30 and also with the extent of movement necessary of that handle, but it serves as a visible mark for him to adjust that handle by. This is a very important and essential point which differentiates my apparatus from any other form of telegraph with which I am acquainted, and also from the signaling system which I have described in my aforesaid pending application. It makes it impossible for the receiving operator to set his contact point wrong, and thus prevents errors which might occur in times of great haste and emergency.

The following points are also to be noted: The arrangement of the bridge is to be such (and this is illustrated in Fig. 1) that a movement of the arm 9 to the left is to cause a deflection of the needle of the galvanometer 8 to the left, and a movement of the arm 9 to the right is to cause a deflection of said galvanometer needle to the right. The wires $a, b$ and $c, d$ may be conveniently made of nickel German silver, with their ends secured in metal plates or clamps, as shown at 36, Fig. 2. It is better to embed the wires $c, d$ and $a, b$ in shallow grooves in the bands of insulating material, which will serve to hold them in place.

Between the leading wires 3 and 4 and the transmitting instrument 1, and also between said leading wires and the transmitting instrument 2, are disposed short coils of nickel German silver wire, 37. Three of these coils may have a resistance of two ohms; the other of 1.9 ohms. The advantage of this arrangement is that when the contacts 10 and 9 are in the same position on their respective conductors, the galvanometer needles are considerably deflected from the position of rest, although they occupy the middle parts of their respective scales. This does not alter the operation of the instrument, as before explained, but the important object attained is, that if any accident whatever befall the apparatus, the bell 17 will at once give the alarm; because, no matter what happened, (if a battery gave out, if a wire be cut, if any contact became imperfect, or if any connection be broken,) the needles in the galvanometers will at once quit their normal positions, and this, in itself, is an indication that something is wrong. In addition, local circuit will be closed at the galvanometer 7, and the bell, as already stated, will ring an alarm until the injury be repaired. This property of self-detection and automatic announcement is of great value, and does not exist in any other form of similar apparatus with which I am familiar.

In the ordinary engine-room telegraph, an injury may happen, and remain totally unknown until an attempt is made to signal; and if this should happen in time of great emergency, the result might be serious disaster to the ship. The two stops, 14 and 15, on the galvanometer 17, should be preferably so located that the needle will not close the circuit when the angular divergence between the two contacts 9 and 10 corresponds to less than five revolutions. This is not essential; but it conduces to convenience in operating the receiver in the engine-room, because it avoids the necessity of great exactness in setting the contact 10 in times of emergency or hurry.

I claim—

1. The combination of a source of electricity, two similar bodies of conducting material located at distant stations, pivoted supports provided at their extremities with contact points moving upon said conductors and combined with one of said supports so as to be moved therewith, an electrical indicating or measuring instrument having a pivoted index or pointer, the pivot center of said index coinciding with the pivot center of said support; the said elements being connected in Wheatstone bridge circuit, substantially as described.

2. The combination of a source of electricity, two similar bodies of conducting material located at distant stations, pivoted supports provided at their extremities with contact points moving upon said conductors, and combined with one of said supports so as to be moved therewith an electrical indicating or measuring instrument having a pivoted index or pointer, the pivot center of said index coinciding with the pivot center of said support, a second electrical indicating or measuring instrument having a needle or pointer oscillating between fixed stops, and an electric bell or alarm in relay circuit with said stops; the said conductors, supports, measuring instrument and source of electricity being connected in Wheatstone bridge circuit, substantially as described.

3. The combination of a source of electricity, two similar bodies of conducting material, $a, b\ c, d$, located at distant stations, pivoted supports provided at their extremities with contact points moving upon said conductors, two unequal resistances in circuit at the extremities of conductor $a\ b$, two equal resistances in circuits at the extremities of conductor $c\ d$, an electrical measuring instrument having a needle or pointer oscillating between fixed stops, and an electric bell or alarm in relay circuit with said stops; the said conductors, supports, measuring instrument, resistances and source of electricity being connected in Wheatstone bridge circuit, substantially as described.

4. In an electrical signaling system, a transmitting instrument containing the cylinder 18, circuit head 20, pivoted arm 9 thereon provided with contact point 27, conductor $a, b$, supported on the periphery of said head 20 and insulated therefrom, and an electrical indicating instrument within said cylinder; the said cylinder having an opening through which said instrument may be seen.

5. In an electrical signaling system, a transmitting instrument containing the cylinder 18, circular head 20, pivoted arm 9 thereon provided with contact point 27, conductor $a\ b$ supported on the periphery of said head 20 and insulated therefrom, an index finger on said arm 9 extending over said cylinder, and an electrical indicating instrument within said cylinder; the said cylinder having a scale-plate below said index finger, and an opening through which said indicating instrument may be seen.

6. In an electrical signaling system a receiving instrument containing a base plate 28, a support 29 pivoted thereon, an electrical measuring or indicating instrument 8, having a pivoted index or pointer 34 and secured to said support with the pivot center of its index coincident with the pivot center of said support, a conductor, $c\ d$, supported on plate 28 and insulated therefrom, and a contact point carried by support 29 and bearing on said conductor, substantially as described.

7. In an electrical signaling system, a receiving instrument containing a base plate, 28, a support, 29, pivoted thereon, an electrical measuring or indicating instrument, 8, having a pivoted index or pointer, 34, and secured to said support with the pivot center of said index coincident with the pivot center of said support, a conductor $c\ d$ supported on plate 28 and insulated therefrom, a contact point, 11, carried by support 29 and bearing on said conductor, and an index finger, 31, also carried by said support 29 and normally disposed in prolongation of the axis of the needle 34 when said needle is at the middle of the scale, substantially as described.

8. In an electrical signaling system, a transmitting instrument containing the cylinder 18, provided with circular heads, 20 and 21, the pivoted arm 9 provided with contact point 27, conductor $a, b$ supported on the periphery of said head 20 and insulated therefrom, an index finger 26, an opening 40 in said cylinder beneath said finger 26 and provided with a translucent scale-plate and a source of illumination within said cylinder, substantially as described.

In witness whereof I have hereunto affixed my signature.

BRADLEY A. FISKE.

Witnesses:
W. A. HUTCHINSON,
GEO. E. H. HARMAN.